No. 738,724. PATENTED SEPT. 8, 1903.
F. KRETZSCHMAR.
BASKET.
APPLICATION FILED NOV. 7, 1902.
NO MODEL.
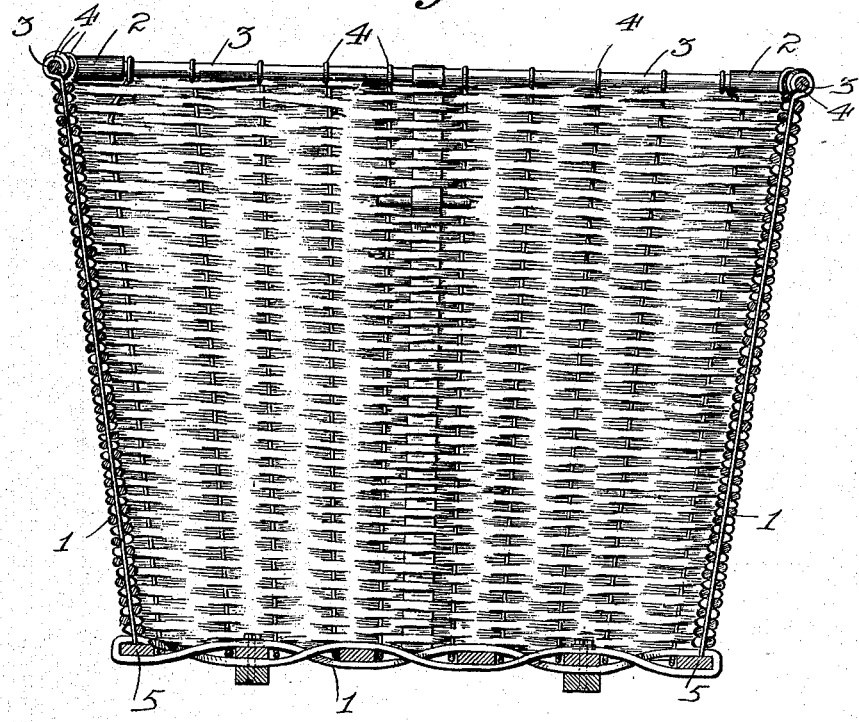
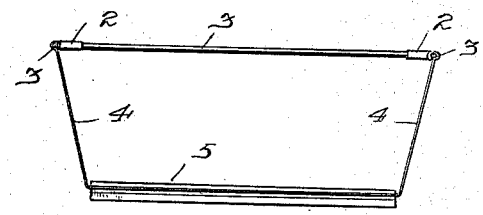
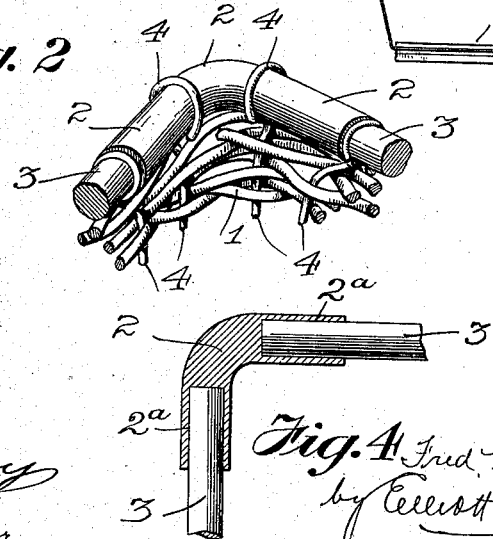

No. 738,724. Patented September 8, 1903.

UNITED STATES PATENT OFFICE.

FRED KRETZSCHMAR, OF CHICAGO, ILLINOIS.

BASKET.

SPECIFICATION forming part of Letters Patent No. 738,724, dated September 8, 1903.

Application filed November 7, 1902. Serial No. 130,440. (No model.)

*To all whom it may concern:*

Be it known that I, FRED KRETZSCHMAR, a citizen of the United States, residing at Chicago, in the county of Cook and State of Illinois, have invented certain new and useful Improvements in Baskets, of which the following is a full, clear, and exact specification.

My improvements have more especial reference to the rim of the basket and its connected parts; and the invention has for its primary object to materially strengthen such rim without, however, constructing the same entirely of metal, as has heretofore been proposed, but which is objectionable, because it is easily bent and difficult to straighten, and the shape of the basket is thereby destroyed, to say nothing of the additional weight and expense entailed by the employment of such metal rims.

With these ends in view my invention consists in certain features of novelty in the construction, combination, and arrangement of parts by which the said object and certain other objects hereinafter appearing are attained, all as fully described with reference to the accompanying drawings, and more particularly pointed out in the claims.

In the said drawings, Figure 1 is a vertical cross-section of a basket constructed according to my invention. Fig. 2 is a perspective view of one corner thereof. Fig. 3 is a diagrammatic section taken at right angles to the section plane of Fig. 1, showing the basket on a smaller scale with the wickerwork omitted; and Fig. 4 is a longitudinal sectional view of one of the corners with the rim-sticks secured therein.

The main body of the basket may be constructed of woven willows, ratan, wickers, or other suitable strips 1 in the usual or any suitable way; but the rim of the basket is composed of a number of plain metallic corners having solid portions and sockets 2 2$^a$ and sticks 3, having their ends inserted in these sockets against the solid portions, as clearly shown in Figs. 2 and 4. The shape of the corners is dependent upon the shape of the basket. If the basket be square or rectangular in plan section, the corners will be of right-angle formation, as shown in Fig. 4, and one of them will be arranged at each corner of the basket, with the ends of the side and end sticks of the rim inserted therein. These sticks 3 may be composed of ratan, bamboo, wood, or any other suitable material, and after they are inserted they, together with the corners, are firmly bound to the body of the basket and practically incorporate therewith by a number of strands or strips 4, which are preferably composed of wire, with their upper ends looped around the sticks 3 and the corners and their intermediate portions incorporated in the body of the basket, as shown in Fig. 1. Thus it will be seen that the sticks 3 will be firmly held in the corners and the corners will be firmly held in place on the basket without aid of any other attaching means, and at the same time the body of the basket will be given a secure support from the rim thus constructed.

Where the sides of the basket are provided with longitudinal bars or sticks 5, which is common in some forms of baskets, the side wires 4 may be secured at their lower ends in these sticks; but where such sticks are not employed the wires are preferably carried along the bottom of the basket, interwoven with the ratan 1, and up the sides or ends, with both extremities of the wires attached to the rim, as shown in the diagrammatic view in Fig. 3, thus preventing the possibility of the rim pulling loose with the wires.

Having thus described my invention, what I claim as new therein, and desire to secure by Letters Patent, is—

1. A basket comprising a continuous body and bottom of woven strips, a rim consisting of corners having sockets and sticks extending from socket to socket and having their ends simply inserted in the sockets, and the binding-wires threaded through the woven strips of the body and looped to the corners and sticks for holding the corners with the sticks in place.

2. A basket comprising a continuous body and bottom of woven strips, a rim consisting of corners having solid portions and sockets and sticks extending from socket to socket and having their ends simply inserted in the sockets and impinging against the solid portions of the corners and the binding-wires threaded through the woven strips of the body and looped to the corners and sticks for holding the corners with the sticks in place.

FRED KRETZSCHMAR.

Witnesses:
JNO. G. ELLIOTT,
F. A. HOPKINS.